(12) United States Patent
Djama

(10) Patent No.: US 7,823,443 B2
(45) Date of Patent: Nov. 2, 2010

(54) SYSTEM FOR DETERMINING INFLATING PRESSURES OF TYRES MOUNTED ON A MOTOR VEHICLE FRONT AND REAR WHEELS

(75) Inventor: Zahir Djama, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 302 days.

(21) Appl. No.: 11/996,958

(22) PCT Filed: Jul. 4, 2006

(86) PCT No.: PCT/FR2006/050667
§ 371 (c)(1),
(2), (4) Date: Jan. 25, 2008

(87) PCT Pub. No.: WO2007/012771
PCT Pub. Date: Feb. 1, 2007

(65) Prior Publication Data
US 2008/0208515 A1   Aug. 28, 2008

(30) Foreign Application Priority Data
Jul. 26, 2005 (FR) .................................. 05 07977

(51) Int. Cl.
*G01M 7/00* (2006.01)
(52) U.S. Cl. ....................................................... 73/146
(58) Field of Classification Search ........................ None
See application file for complete search history.

(56) References Cited

U.S. PATENT DOCUMENTS

| 4,355,297 | A | * | 10/1982 | Sinha et al. | .................. 340/443 |
| 4,567,460 | A | | 1/1986 | Gebler | |
| 4,574,267 | A | * | 3/1986 | Jones | .......................... 340/443 |
| 6,060,984 | A | * | 5/2000 | Braun et al. | .................. 340/442 |
| 6,235,124 | B1 | * | 5/2001 | Rubin | .......................... 134/26 |
| 6,394,159 | B1 | * | 5/2002 | Cobb | .......................... 152/416 |
| 6,425,427 | B1 | * | 7/2002 | Stech | .......................... 152/417 |

(Continued)

FOREIGN PATENT DOCUMENTS

DE           3151254 A1      7/1983

(Continued)

OTHER PUBLICATIONS

Mayer, Model based detection of tyre deflation by estimation of a virtual transfer function, Control Applications, 1995, Proceedings of the 4$^{th}$ IEEE conference on Albany, NY, Sep. 28, 1995, pp. 285-290.

(Continued)

*Primary Examiner*—Lisa M Caputo
*Assistant Examiner*—Jermaine Jenkins
(74) *Attorney, Agent, or Firm*—Nicolas E. Seckel

(57) ABSTRACT

The invention concerns a system for determining inflating pressure of tires mounted on a motor vehicle front and rear wheels. Said system comprises means (12, 14) for acquiring inflating pressures of the front and rear wheels, means (16, 18) for acquiring vertical accelerations of the front and rear wheels, and means (32) for emerging the acquired pressures and the acquired accelerations to estimate the inflating pressures of the front and rear tires.

19 Claims, 3 Drawing Sheets

U.S. PATENT DOCUMENTS

| | | | |
|---|---|---|---|
| 6,435,238 B1* | 8/2002 | Hennig | 152/417 |
| 7,162,333 B2* | 1/2007 | Koibuchi et al. | 701/1 |
| 7,168,468 B2* | 1/2007 | Wang et al. | 152/427 |
| 7,185,688 B2* | 3/2007 | Hayes et al. | 152/417 |
| 7,207,365 B2* | 4/2007 | Nelson et al. | 152/417 |
| 7,273,082 B2* | 9/2007 | White et al. | 152/417 |
| 7,590,481 B2* | 9/2009 | Lu et al. | 701/70 |
| 7,657,393 B2* | 2/2010 | Djama | 702/140 |
| 2007/0067085 A1* | 3/2007 | Lu et al. | 701/70 |

FOREIGN PATENT DOCUMENTS

| | | |
|---|---|---|
| DE | 4009540 A1 | 9/1991 |
| FR | 2858267 A | 2/2005 |
| JP | 11078465 A * | 3/1999 |

OTHER PUBLICATIONS

International Search Report mailed Feb. 13, 2007 in PCT/FR2006/050667.

* cited by examiner

SYSTEM FOR DETERMINING INFLATING PRESSURES OF TYRES MOUNTED ON A MOTOR VEHICLE FRONT AND REAR WHEELS

The present invention concerns a system for determining the inflating pressure of tires mounted on a motor vehicle front and rear wheels.

Such systems are known in the art, which comprise accelerometers with which a front wheel and a rear wheel of the vehicle are equipped to measure their vertical accelerations, means for estimating the coefficients of stiffness of the tires of these wheels as a function of the measured accelerations, and means for calculating the inflating pressures of these tires as a function of the estimated coefficients of stiffness.

In such systems, when one of the accelerometers is defective, the estimation of the inflating pressures of the tires is no longer available. In addition, when the measurements by the accelerometers are faulty, for example, when they are marred by a non-negligible noise or when the measurements of the front acceleration and of the rear acceleration are no longer coherent, these systems provide erroneous estimations of the pressures.

Similarly, these systems estimate the inflating pressure of the tires in a less than satisfactory manner when the tires are undergoing rapid decreases in pressure. Further, the precision of the estimations is highly dependent on the type of trajectory followed by the vehicle.

Systems for monitoring the inflating pressures of tires of a vehicle are also known, which comprise pressure sensors directly located in the tires.

The pressure sensors of such systems comprise means for emitting data operating in association with corresponding receiving means on-board the vehicle.

However, communication problems between the emitting and receiving means often occur, for example, because of excessive noise, so that the tire pressure monitoring function is not performed in a satisfactory manner.

In addition, when a pressure sensor is defective, no inflating pressure measurement is available for the tire associated with this sensor.

An objective of the present invention is to remedy these problems by proposing a system based on data redundancy that makes it possible to increase reliability and precision.

To this effect, an object of the invention is a system for determining the inflating pressures of tires mounted on front and rear wheels of a motor vehicle, characterized in that it comprises:
  means for acquiring inflating pressures of the tires of the front and rear wheels;
  means for acquiring vertical accelerations of the front and rear wheels; and
  means for merging the acquired pressures and the acquired accelerations to estimate the inflating pressures of the tires of the front and rear wheels.

According to particular embodiments, the system according to the invention can comprise one or more of the following characteristics:
  the merging means comprise:
    means for estimating the coefficients of stiffness of the tires of the front and rear wheels as a function of the acquired vertical accelerations of these wheels; and
    means for estimating the inflating pressures of the tires of the front and rear wheels as a function of the acquired inflating pressures and of the acquired coefficients of stiffness of the tires of the front and rear wheels,
  the means for estimating the coefficients of stiffness comprise means for temporally resetting one of the acquired accelerations on the other of the acquired accelerations and means for calculating the coefficients of stiffness as a function of the thus temporally reset accelerations;
  the means for estimating the coefficients of stiffness comprise means for bandpass filtering the acquired accelerations arranged between means for acquiring the accelerations and the temporally resetting means;
  the passband filtering means are adapted to perform filtering in a range of frequencies substantially equal to [8, 20] Hz.;
  the temporally resetting means comprise means for calculating the inter-correlation of the acquired accelerations and means for applying a delay corresponding to the maximum of the calculated inter-correlation to the acquired acceleration of the front wheel;
  the means for calculating the coefficients of stiffness are adapted to implement a recursive least square algorithm in real time based on a predetermined mechanical model of the wheel;
  the estimation means are adapted to estimate said coefficients of stiffness from a mono-wheel mechanical model of the front and rear wheels;
  the estimation means are adapted to estimate said coefficients of stiffness based on a model in discrete time of the temporally reset accelerations of the front and rear wheels according to the equation:

$$Avr(k) = \frac{1}{mrr}(mra \times Ava(k-n)\ Zva(k-n) - Zvr(k))\binom{Kpr(k)/Kpa(k)}{Kpr(k)}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are the coefficients of stiffness of the tires of the rear and front wheels, respectively, and n is a sampling instant corresponding to a time shift between the rear and front wheels subjected to a same portion of the roadway;
  the estimation means are adapted to estimate said coefficients of stiffness based on a model in discrete time of the temporally reset accelerations of the front and rear wheels according to the equation:

$$Ava(k) = \frac{1}{mra}(mrr \times Avr(k+n)\ Zvr(k+n) - Zva(k))\binom{Kpa(k)/Kpr(k)}{Kpa(k)}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are coefficients of stiffness of the tires of the rear and front wheels, respectively, and n is a sampling instant corresponding to a time shift between the rear and front wheels subjected to a same portion of the roadway;
  the estimation means are adapted to estimate said coefficients of stiffness from a bicycle mechanical model thereof;
  the estimation means are adapted to estimate said coefficients of stiffness based on a model in discrete time of the temporally reset accelerations of the front and rear wheels according to the equation:

$$Avr(k) = \begin{pmatrix} \frac{mra}{mrr} Ava(k-n) \\ \frac{1}{mrr}(Zva(k-n) - Zvr(k)) \\ \frac{1}{mnr}\dot{Z}va(k-n) \\ -\frac{1}{mrr}\dot{Z}vr(k) \end{pmatrix}^T \begin{pmatrix} Kpr(k)/Kpa(k) \\ Kpr(k) \\ (Kpr(k)/Kpa(k)) \times Ra(k) \\ Rr(k) \end{pmatrix}$$

where k is the k$^{th}$ sampling instant, Avr and Ava are the vertical accelerations of the rear and front wheels, respectively, Zvr and Zva are the altitudes of the centers of the rear and front wheels, respectively, Kpr and Kpa are the coefficients of stiffness of the tires of the rear and front wheels, respectively, n is a sampling instant corresponding to a time shift between the rear and front wheels subjected to a same portion of the roadway, Ra and Rr are coefficients of stiffness of the suspensions of the front and rear wheels, respectively, and $\dot{Z}va$ and $\dot{Z}vr$ are first derivatives of the altitudes of the centers of the front and rear wheels, respectively;

the means for estimating the inflating pressures are adapted to implement, for each of the front and rear wheels, a Kalman estimator based on a model linking the inflating pressure and the coefficient of stiffness of the wheel tire;

the merging means are adapted to implement a Kalman estimator based on a model linking the inflating pressures of the tires and the vertical accelerations of the front and rear wheels;

the system further comprises means for diagnosing the operating state of the means for acquiring the inflating pressures and the mounting states of the tires as a function of the estimated and acquired inflating pressures and of the acquired vertical accelerations of the front and rear wheels;

if an acquired inflating pressure and its associated estimated pressure differ by more than X %, where X is a predetermined number, the diagnostic means are adapted to calculate the inflating pressures of the tires of the front and rear wheels as a function of the acquired vertical accelerations of these wheels, so as to compare the acquired pressure to the calculated pressures and to determine that, if the acquired pressure corresponds to one of the calculated pressures, the tire associated to the calculated pressure corresponding to the acquired pressure has been mounted in reverse; and if none of the tires is mounted in reverse, then the diagnostic means are adapted to diagnose that the acquisition means associated to the acquired pressure are defective.

The invention will be better understood by reading the following description which is given by way of example only, in reference to the annexed drawings in which.

The system according to the invention is based on a mechanical model of the interactions between the body C of a vehicle, having a mass Mc, the wheels R of this vehicle, and the ground S.

Figure 1:
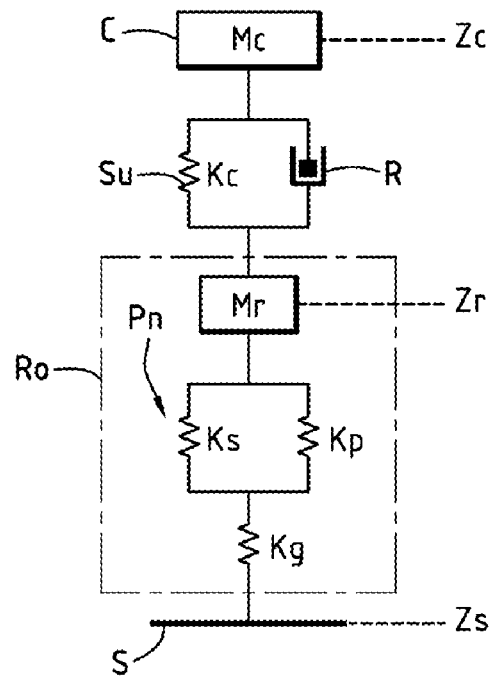
FIG. 1 is a schematic view of a mechanical model used by a system according to the invention.

A first example of a mechanical model of these interactions is illustrated on FIG. 1, which is a schematic view of a model, of the "mono-wheel" type, of the interactions between a wheel Ro of the vehicle, the body C of this vehicle, and the ground S.

As shown on this Figure, in this model with two degrees of freedom, the body C of the vehicle is assimilated to a mass Mc suspended to the wheel Ro having a mass Mr by a suspension Su assimilated to a spring/shock absorber set having a stiffness Kc and a damping coefficient R.

The wheel Ro and the body C move along a vertical direction and are positioned at altitudes Zr and Zc, respectively, with respect to a reference level, for example, the altitude of the ground when the vehicle starts.

The wheel Ro carries a tire Pn that lays on the ground S and is likened to a spring having a stiffness K composed of a spring that models the envelope of the tire Pn having a structural stiffness Ks in parallel with a spring that models the gas contained in the tire having a pneumatic stiffness Kp, this set being in series with a spring that models the rubber of the tire having a rubber stiffness Kg.

The behavior of this mechanical system is controlled by the evolution with time of the altitude Zs of the ground with respect to the reference level, i.e., the profile of the roadway.

Besides, it is known that the inflating pressure Pg of the tire is directly linked to the rubber stiffness Kp of this tire; this dependency can be modeled, for example, according to the equation:

$$Pg = \left(\frac{Kp}{c}\right)^{-\alpha} \tag{1}$$

where c and $\alpha$ are predetermined constants, for example, substantially equal to 6.7 and 0.85, respectively, for a given tire.

Figure 2:
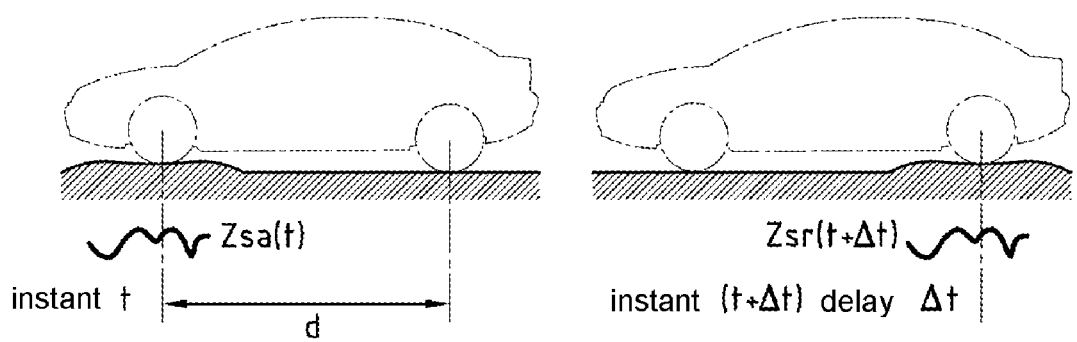
FIG. 2 is a schematic view illustrating a calculation hypothesis used by a system according to the invention.

The system according to the invention is also based on the following observation presented on FIG. 2, which illustrates the advance of a vehicle on a roadway between two instants t and t+$\Delta$t.

As illustrated on this Figure, the front and rear wheels of the vehicle are subjected, most of the time, to the same roadway profile with a time shift $\Delta$t that depends on the speed V and the wheel base d of the vehicle.

To determine the coefficients of stiffness of the tires and thus their inflating pressures, as will appear with more details below, the system according to the invention is thus advantageously based on the following equation:

$$Z_{sa}(t) = Z_{sr}(t+\Delta t) \tag{2}$$

where t is time, $\Delta$t is the time separating the passage of a front wheel on a location on the roadway and the passage of a rear wheel at this same location, $Z_{sa}$ is the altitude of the ground at the front wheel and $Z_{sr}$ is the altitude of the ground at the rear wheel.

Figure 3:
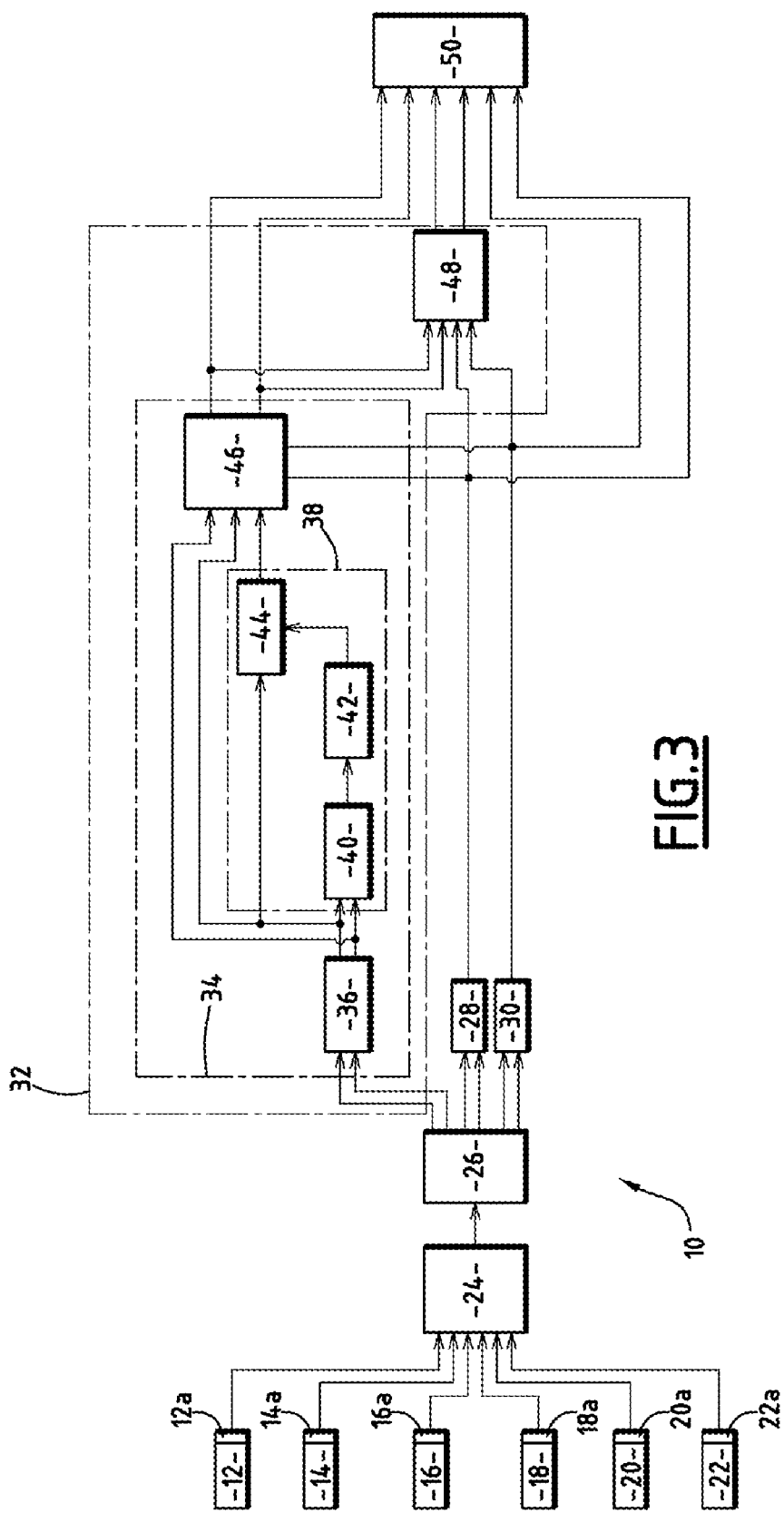
FIG. 3 is a schematic view of a system according to the invention.

FIG. 3 illustrates schematically a system for determining the inflating pressure of the tires mounted on a front wheel and a rear wheel of a motor vehicle, arranged on a same side of this vehicle, and designated by the general reference numeral 10.

This system comprises, associated to each of the front and rear wheels:

a pressure sensor 12, 14 to measure and supply the inflating pressure of the tire Pa, Pr of the wheel, for example, mounted inside the tire;

an accelerometer 16, 18 to measure and supply the vertical acceleration Avr, Ava of the wheel at its center, for example, a mono-axis or tri-axis accelerometer mounted at the center of the wheel; and a temperature sensor 10, 22 to measure and supply the temperature Ta, Tr of the gas contained in the tire of the wheel, for example, a temperature sensor mounted inside the tire.

Each of these sensors 12-22 comprises means 12a, 14a, 16a, 18a, 20a, 22a forming emitting antenna for supplying a low-frequency electromagnetic signal representative of the magnitude it measures.

Means 24 forming receiving antenna are provided in the system 10 to receive the signals emitted by the sensors 12-22 and to extract from these signals the corresponding measured values Ava, Avr, Pa, Pr, Ta, Tr.

The means forming receiving antenna are connected to an analog/digital converter 26 (ADC), for example, a zero order hold circuit The ADC 26 is adapted to sample all the measurements Ava, Avr, Pa, Pr, Ta, Tr with a predetermined sampling frequency fe, for example, 50 Hz, and to supply sampled measurements Ava(k), Avr(k), Pa(k), Pr(k), Ta(k), Tr(k), where k is the $k^{th}$ sampling instant.

Compensation means 28, 30 are connected to the ADC 26 and are adapted to correct the measurement of the inflating pressure Pa(k), Pr(k) of each tire by the corresponding temperature measurement Ta(k), Tr(k) in order to compensate the temperature shifts of the pressure sensors 12, 14 with respect to a nominal operating state, as is in itself known in the art.

The system 10 further comprises means 32 for merging the inflating pressures of the tires and the vertical accelerations of the front and rear wheels. These merging means 32 are particularly adapted to estimate the inflating pressure of the tires using the redundancy of data contained in these measures. The estimation of the inflating pressures is thus more reliable and more precise. This estimation is largely independent from the aberrant measurements of the sensors and from the corruptions of these measurements due to the wireless transmission of the data between the sensors and the rest of the system.

The merging means 32 comprise means 34 for estimating the coefficients of stiffness Kpa, Kpr of the tires of the front and rear wheels as a function of the measurements of the vertical accelerations of these wheels.

These estimation means 34 comprise a bandpass filter 36 connected to the ADC 26 and adapted to process the sampled accelerations Ava(k), Avr(k) by applying to them a bandpass filtering. This filtering is performed in a frequency range in which the power of the modes of the front and rear wheels is essentially concentrated. This frequency range corresponds to the range of resistance to rolling and is for example substantially equal to the range [8; 20] Hz.

The estimation means 34 also comprise temporally resetting means 38 connected to the bandpass filter 36 and adapted to temporally reset the sampled acceleration Ava(k) of the front wheel on the sampled acceleration Avr(k) of the rear wheel to supply as output temporally reset accelerations Avr(k), Ava(k−n) of the front and rear wheels, corresponding to the same altitude of the ground so as to apply the hypothesis according to the above-described equation (2).

To this effect, these temporally resetting means 38 comprise calculation means 40 adapted to estimate the digital inter-correlation IC(N) of the accelerations Avr(k), Ava(k) supplied by the filter 36 according to the equation:

$$IC(N) = \sum_{k=-\infty}^{+\infty} Avr(k) \times Ava(N-k) \quad (3)$$

The means 40 for calculating the inter-correlation are adapted to perform an estimator of this inter-correlation, as is known in itself in the field of signal processing.

The temporally resetting means 38 also comprise, connected to the calculation means 40, means 42 for determining the maximum of the inter-correlation IC(N) and of the sampling instant n corresponding to this maximum. This instant n thus corresponds to the time shift n/fe between the front and rear wheels subjected to the same portion of the roadway.

The temporally resetting means 44 are connected to the means 42 and to the filter 36, and they are adapted to apply a delay of n samplings to the sampled acceleration Ava(k) of the front wheel and thus to supply a sampled acceleration Ava(k−n) temporally reset on the sampled acceleration Avr(k) of the rear wheel.

The means 34 for estimating the coefficients of stiffness of the tires of the front and rear wheels further comprise means 46 for calculating these coefficients, connected to the filter 36 to receive the accelerations Avr(k), Ava(k) of the rear and front wheels and to the temporally resetting means 44 to receive the temporally reset acceleration Ava(k−n) of the front wheel.

These calculation means 46 are adapted to calculate the coefficients of stiffness of the tires of the front and rear wheels as a function of the accelerations that they receive based on the mechanical model of FIG. 1 to model the dynamic behavior of the front and rear wheels.

More particularly, by using the fundamental principle of dynamics applied to this model in connection with the hypothesis according to equation (2), it can be shown that the vertical accelerations Avr(k), Ava(k) of the centers of the wheels can be modeled in discrete time according to the equations:

$$Avr(k) = \frac{1}{mrr}(mra \times Ava(k-n) \; Zva(k-n) - Zvr(k)) \binom{Kpr(k)/Kpa(k)}{Kpr(k)} \quad (4)$$

$$Ava(k) = \frac{1}{mra}(mrr \times Avr(k+n) \; Zvr(k+n) - Zva(k)) \binom{Kpa(k)/Kpr(k)}{Kpa(k)} \quad (5)$$

where mrr and mra are the masses of the rear and front wheels, respectively, and Zvr and Zva are the altitudes of the centers of the rear and front wheels, respectively, with respect to the reference level.

The calculation means 46 are adapted to perform a recursive least square algorithm in real time based on the equation (4), according to the equations:

$$\hat{\theta}(k+1) = \hat{\theta}(k) + K(k+1)(Avr(k+1) - A(k+1)\hat{\theta}(k)) \quad (6)$$

$$K(k+1) = \overline{\omega}^{-1} S(k) X^T(k+1)(\sigma^2(k) + \overline{\omega}^{-1} A(k+1) S(k) A^T(k+1))^{-} \quad (7)$$

$$S(k+1) = \overline{\omega}^{-1}(S(k) - K(k+1)A(k+1)S(k)) \quad (8)$$

$$X(k+1) = E(A^T(k+1)A(k+1))^{-1} \quad (9)$$

$$\sigma(k) = Var(e(k)) \quad (10)$$

where $(\bullet)^T$ is the symbol of the transpose, $\hat{\theta}(k)$ is the estimate of the parameter vector $$\theta = \begin{pmatrix} Kpr/Kpa \\ Kpr \end{pmatrix}$$

at instant k, A(k) is the regression vector $$\begin{pmatrix} \frac{mrr}{mra}Avr(k+n) & \frac{1}{mra}(Zva(k-n) - Zvr(k)) \end{pmatrix}$$

at instant k, $E(A^T(k)A(k))$ is the variance of the vector $A^T$ at instant k, Var(e(k)) is the variance of the estimation error $e(k)=Avr(k)-A(k)\theta(k)$ at instant k, $\overline{\omega}$ is a predetermined default factor and K(k), X(k), and S(k) are intermediate vectors or matrices used during the estimation of the vector $\theta$.

Preferably, the means 46 are adapted to calculate the altitudes Zvr(k), Zvr(k−n) of the centers of the rear and front wheels at each sampling time as a function of the vertical accelerations Avr(k) and Ava(k−n), for example, by performing a double integration of these values after they have been filtered between 8 Hz and 20 Hz. Another example of a calculation of the altitude of a wheel as a function of its vertical acceleration is described in French patent application FR 2 858 267 by the same applicant.

As a variant, the estimation means 34 are adapted to perform a recursive least square algorithm in real time based on the equation (5) in a manner analogous to the above-described manner.

As a variant, the means 34 are adapted to perform an inversion and deconvolution algorithm based on the equation (4) or (5) to estimate the coefficients of stiffness.

The calculation means 46 are thus adapted to supply at each sampling instant estimated values Kpa(k) and Kpr(k) of the coefficients of rubber stiffness of the front and rear wheels.

The merging means 32 also comprise, connected to the calculation means 46 and to the compensation means 28, 30, means 48 for estimating the inflating pressures of the tires of the front and rear wheels. These estimation means 48 are adapted to perform, for each of the front and rear wheels, an algorithm merging the compensated inflating pressure Pac(k), Prc(k) with the estimation of the coefficient of stiffness Kpa(k), Kpr(k) of the tire of the wheel to estimate the inflating pressure of this tire.

To remain concise, only the merging of the data associated with the front wheel will be described, the merging of the data associated with the rear wheel being obtained in a manner identical to that of the front wheel.

For example, the estimation means 48 perform an extended Kalman algorithm for the calculation of an estimation $\hat{K}pa(k)$ of the coefficient of stiffness of the front wheel as a function of the compensated inflating pressure Pac(k) of its tire and of the coefficient of stiffness Kpa(k) estimated by the calculation means 46, from an observation model according to the equation:

$$Y(k+1) = h(Pac(k)) + w(k) \quad (11)$$

where Y is the observed magnitude at instant k+1, here, the coefficient of stiffness, $h(Pac(k)) = cPac(k)^\alpha$ and w(k) is a measurement noise on the coefficient of stiffness having a predetermined variance $\sigma_{Kpa}$.

For example, the estimation means 48 are adapted to perform a Kalman algorithm according to the equations:

$$\hat{K}pa(k+1) = \hat{K}pa(k) + K(k+1)(Kpa(k+1) - h(Pac(k))) \quad (12)$$

$$Q(k+1/k) = E(\hat{K}pa(k)\hat{K}pa(k)) \quad (13)$$

$$H(k+1) = \frac{\partial h}{\partial Pac}(Pac(k+1)) = c\alpha Pac(k+1)^{\alpha-1} \quad (14)$$

$$Q(k+1/k+1) = Q(k+1/k) - K(k+1)H(k+1)Q(k+1/k) \quad (15)$$

$$K(k+1) = Q(k+1/k)H(k+1)(\sigma_{Kpa}^2 + H(k+1)Q(k+1/k)H(k+1))^{-1} \quad (16)$$

where K(k+1) is the Kalman gain matrix at instant k+1, Q(k+1/k) is the prediction by the covariance matrix of the estimation error at instant k+1, and Q(k+1)/k+1) is the correction of the covariance matrix of the estimation error at instant k+1.

As it can be observed, the calculation at instant k+1 of the estimation $\hat{K}pa(k+1)$ of the coefficient of stiffness of the tire of the front wheel is performed as a function of an estimation error formed by the difference between the coefficient of stiffness Kpa(k+1) of the tire of the front wheel estimated by the calculation means 46 and a coefficient of stiffness h(Pac(k)) of this tire calculated according to the equation $h(Pac(k)) = cPac(k)^\alpha$ as a function of the compensated inflating pressure Pac(k) at instant k of the tire of the front wheel.

Thus, the estimation means 48 are adapted to estimate the coefficient of stiffness of the tire of a wheel, and thus, the inflating pressure of this tire via the equation (1), with increased precision because two complementary sources of data concerning this pressure are used. This makes it possible in particular to reject aberrant values in the measurement of the inflating pressure by the pressure sensor 12, 14 and the data transmission errors between means 12a, 14a forming emitting antenna of this sensor 12, 14 and the means 24 forming receiving antenna.

As a variant, the calculation means 48 perform an extended Kalman algorithm for the calculation of an estimation $\hat{P}ac(k)$ of the coefficient of stiffness of the front wheel as a function of the compensated inflating pressure Pac(k) of its tire and of the coefficient of stiffness Kpa(k) estimated by the calculation means 46 from an observation model according to the equation:

$$Y(k+1) = g(Kpa(k)) + v(k) \quad (17)$$

where Y is the observed magnitude at instant k+1, here, the inflating pressure, $$g(Kpa(k)) = \left(\frac{Kpa}{c}\right)^{-\alpha}$$

and v(k) is a measurement noise on the compensated inflating pressure having a predetermined variance $\sigma_{Pa}$.

For example, in this variant, the estimation means 48 are adapted to perform an algorithm according to the equations:

$$\hat{P}ac(k+1) = \hat{P}ac(k) + K(k+1)(Pac(k+1) - g(Kpa(k))) \quad (18)$$

$$S(k+1/k) = E(\hat{P}ac(k)\hat{P}ac(k)) \quad (19)$$

-continued $$G(k+1) = \frac{\partial g}{\partial Kpa}(Kpa(k+1)) - \alpha\left(\frac{Kpa(k+1)}{c}\right)^{-\alpha-1} \quad (20)$$

$$S(k+1/k+1) = S(k+1/k) - K(k+1)G(k+1)S(k+1/k) \quad (21)$$

$$K(k+1) = S(k+1/k)G(k+1)(\sigma_{Kpa}^2 + G(k+1)S(k+1/k)G(k+1))^{-1} \quad (22)$$

where S(k+1/k) is the prediction by the covariance matrix of the estimation error at instant k+1, and S(k+1/k+1) is the correction of the covariance matrix of the estimation error at instant k+1.

As it can be observed, the calculation at instant k+1 of the estimation P̂ac(k) of the inflating pressure of the tire of the front wheel is performed as a function of an estimation error formed of the difference between the compensated inflating pressure Pa(k+1) of the tire of the front wheel and an inflating pressure g(Kpa(K)) of this tire calculated according to the equation $$g(Kpa(k)) = \left(\frac{Kpa}{c}\right)^{-\alpha}$$

as a function of the coefficient of stiffness Kpa(k) of this tire at instant k.

Thus, in this variant also, the calculation means 46 are adapted to estimate the inflating pressure of the tire of a wheel with increased precision because two complementary sources of data concerning this pressure are used. Just like the previous variant, this makes it possible in particular to reject aberrant values in the measurement of the inflating pressure by the pressure sensor 12, 14 and the data transmission errors between means 12a, 14a forming emitting antenna of this sensor and means 24 forming receiving antenna.

In another embodiment of the system according to the invention, the merging means 32 are adapted to merge directly the inflating pressures of the tires with the vertical accelerations of the wheels.

In this embodiment, the merging means 32 are structurally analogous to those described in relation to FIG. 3. They comprise the bandpass filter 36 as well as the temporally resetting means 38.

The means 48 for estimating the inflating pressures of the tires are connected to the filter 36 to receive the accelerations Avr(k), Ava(k) of the rear and front wheels, to the temporally resetting means 44 to receive the temporally reset acceleration Ava(k−n) of the front wheel, and to the compensation means 28, 30 to receive the compensated inflating pressures Pac(k), Prc(k).

In this embodiment, the estimation means 48 perform an extended Kalman algorithm for the calculation of an estimation K̂pa(k) of the coefficient of stiffness of the front wheel as a function of the compensated inflating pressure Pac(k) of its tire and of the accelerations that they receive from an observation model according to the equation:

$$Y(k+1) = d(Pac(k), Prc(k)) + x(k) \quad (23)$$

where Y is the magnitude observed at instant k+1, here, the vertical acceleration of the front wheel, $$d(Pac(k), Prc(k)) = \frac{1}{mrr}(mra \times Ava(k-n)\ Zva(k-n) - Zvr(k))\left(\frac{Prc(k)/Pac(k)}{cPrc(k)}\right)^{-\alpha} \quad (24)$$

and x(k) is a measurement noise on the vertical acceleration of the rear wheel having a predetermined variance $\sigma_{vr}$.

For example, in this embodiment, the estimation means 48 are adapted to implement an algorithm according to the equations:

$$\hat{P}ac(k+1) = \hat{P}ac(k) + K(k+1)(Avr(k+1) - d(Pac(k), Prc(k))) \quad (25)$$

$$R(k+1/k) = E(\hat{P}ac(k)\hat{P}ac(k)) \quad (26)$$

$$D(k+1) = \left(\frac{\partial d}{\partial Pac}(Pac(k+1))\frac{\partial d}{\partial Prc}(Prc(k+1))\right)^T \quad (27)$$

$$R(k+1/k+1) = R(k+1/k) - K(k+1)D(k+1)R(k+1/k) \quad (28)$$

$$K(k+1) = R(k+1/k)D(k+1)(\sigma_{vr}^2 + D^T(k+1)R(k+1/k)D(k+1))^{-1} \quad (29)$$

where R(k+1/k) is the prediction by the covariance matrix of the estimation error at instant k+1, and R(k+1/k+1) is the correction of the covariance matrix of the estimation error at instant k+1.

The altitude at the ground of the front and rear wheels are, for example, calculated in the manner described above.

As it can be observed, the calculation at instant k+1 of the estimation P̂ac(k) of the inflating pressure of the tire of the front wheel is performed as a function of an estimation error formed of the difference between the acquired vertical acceleration Avr(k+1) of the tire of the front wheel and a vertical acceleration d(Pac(k), Prc(k)) of this wheel calculated according to the equation (24) as a function of the compensated inflating pressures of the tires at instant k.

Thus, in this embodiment, the calculation means 46 are adapted to estimate the inflating pressure of the tire of a wheel with increased precision because two complementary sources of data concerning this pressure are used. Just like previously, this makes it possible in particular to reject aberrant values in the measurement of the inflating pressure by the pressure sensor 12, 14 and the data transmission errors between means 12a, 14a forming emitting antenna of this sensor 12, 14 and means 24 forming receiving antenna.

Finally, the system 10 according to the invention comprises diagnostic means 50 connected to the compensation means 28 and 30 and to the means 48 for estimating the inflating pressures.

These diagnostic means are adapted in particular to diagnose malfunctions in the area of each tire, i.e., that the pressure sensor mounted in this tire has failed or that the tire has been mounted in reverse (for example, the tire has been mounted on the left front wheel instead of the left rear wheel as should have been the case normally) by comparing the compensated inflating pressures to the respective estimated inflating pressures.

For example, the means 50 diagnose that the pressure sensor has failed or that the tire comprising this sensor has been mounted on a wrong wheel, if the compensated and estimated pressures associated with this tire differ by more than X %, where X is a predetermined number, during at least a predetermined duration.

The measurement of the pressure sensor 12, 14 is included in a communication framework including a sensor identification field, and the framework is emitted by the means 12a, 14a forming emitting antenna toward the means 24 forming receiving antenna. The latter then extract the measurement from the received framework and associate this measurement to the sensor identified by the identification field.

Thus, if the tire is mounted on the left front wheel instead of the left rear wheel, the means 24 associate the measurement extracted from the communication framework to the left rear wheel and not to the left front wheel. This causes errors in the calculations using such a measurement and thus to an estimation of the inflating pressure of the tires that is not valid.

However, the accelerometers 16, 18 are not mounted in the tires but on the wheels so that they cannot be mounted in reverse.

If the estimated pressure and the compensated pressure associated by the system according to the invention to a same tire differ by more than X %, the means 50 then calculate the inflating pressures of the front and rear wheels from the equation (1) as a function of the coefficients of stiffness calculated by the means 46.

As a variant, the means 50 calculate these coefficients of stiffness as a function of the vertical accelerations as has been described above, if they have not yet been calculated, then calculate the inflating pressures as a function these coefficients.

The means 50 then compare the compensated pressure to each of the thus calculated pressures.

If the compensated pressure corresponds to one of the pressures calculated as a function of the coefficients of stiffness, then the diagnostic means 50 locate the tire from which the failure originates as being the one associated with the pressure calculated as a function of the coefficients of stiffness, i.e., the tire associated with the accelerometer whose measurements have been used to calculated the coefficient of stiffness of the tire of the wheel on which it is mounted.

If the compensated pressure does not correspond to any of the pressures calculated as a function of the coefficients of stiffness, then the means 50 diagnose a defective state of the pressure sensor associated with this compensated pressure.

As a variant, the means 50 diagnose that a pressure sensor has failed or that a tire has been mounted in reverse if the covariance matrix Q(k/k), R(k/k), S(k/k) of the associated estimation error calculated by the estimation means 48 does not tend toward 0.

Finally, if the compensated pressures and the predicted pressures correspond, then the means 50 diagnose the inflating state of the tires as a function of the estimated inflating pressures.

For example, the means 50 are adapted to compare each of these estimated pressures to a predetermined set of pressure intervals, each being representative of a tire inflating state (flat, under-inflated, normally inflated, over-inflated). The means 50 thus determine the inflation state of the tire associated to this estimated pressure as a function of whether this estimated pressure is within one of the pressure intervals.

Particular embodiments of the invention have been described.

As a variant, the means 28, 30 for compensating the inflating pressures and the temperature sensors 20, 22 are omitted, the above-described algorithms being performed as a function of the acquired inflating pressures supplied by the pressure sensors 12, 14.

Figure 4:
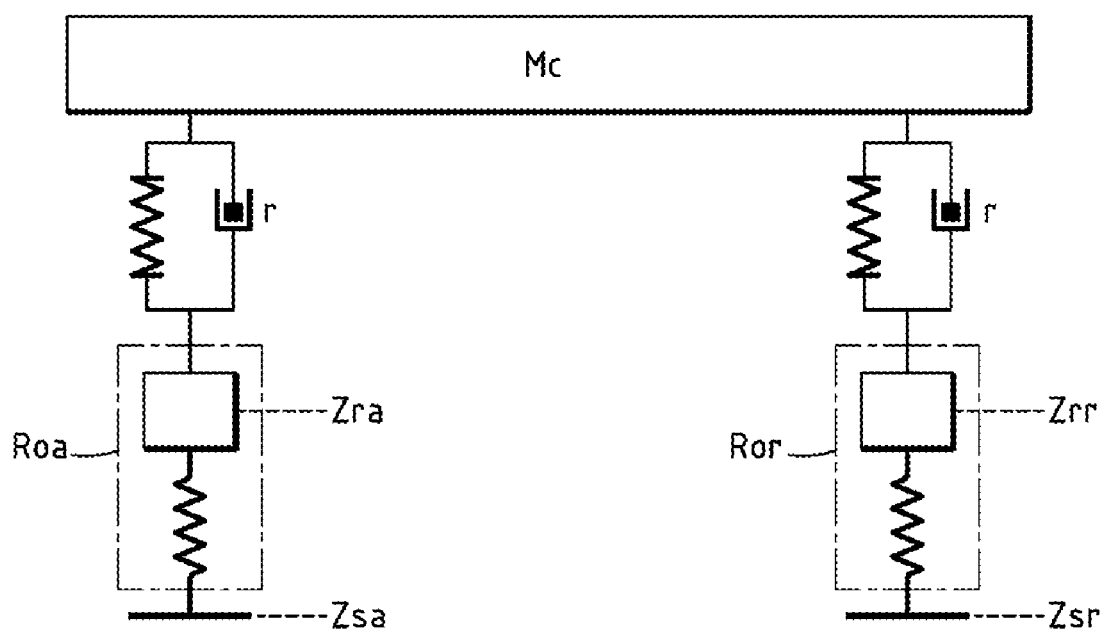
FIG. 4 is a schematic view of a second mechanical model used by another embodiment of the system according to the invention.

A system based on a mechanical model of the wheel illustrated on FIG. 1 has been described. As a variant, the system is based on the mechanical model illustrated on FIG. 4. FIG. 4 is a schematic view of a mechanical model generally designated by the expression "bicycle model." This type of model makes it possible in particular to take into account the case of active suspensions with which the vehicle is equipped, and it applies to front and rear wheels arranged on a same side of a vehicle.

The difference with the model of FIG. 1 lies in that the body C of the vehicle is assimilated to a mass Mc suspended both to the front wheel Roa and to the rear wheel Ror.

Based on the fundamental principle of dynamics applied to this bicycle model and on the hypothesis according to equation (2), it can be shown that the vertical accelerations Ava(k), Avr(k) of the front and rear wheels can be modeled according to the equation:

$$Avr(k) = \begin{pmatrix} \frac{mra}{mrr} Ava(k-n) \\ \frac{1}{mrr}(Zva(k-n) - Zvr(k)) \\ \frac{1}{mnr} \dot{Z}va(k-n) \\ -\frac{1}{mrr} \dot{Z}vr(k) \end{pmatrix}^T \begin{pmatrix} Kpr(k)/Kpa(k) \\ Kpr(k) \\ (Kpr(k)/Kpa(k)) \times Ra(k) \\ Rr(k) \end{pmatrix} \quad (30)$$

where Ra and Rr are coefficients of stiffness of the front and rear wheels, respectively, and Żva and Żvr are the first derivatives of the altitudes of the centers of the front and rear wheels, respectively, i.e., the vertical movement speeds of these wheels.

The previous equations are then modified to take into account the introduction of these first derivatives.

Similarly, merging means 32 based on an estimation of the inflating pressures by Kalman filtering have been described. Other types of estimation are possible. For example, as a variant, the estimation means 48 perform an estimation of the inflating pressures based on a Baysian filtering using one or the other of the observation models according to the equations (11), (17), and (23).

A system according to the invention has been described as applied to a pair of front and rear wheels of a motor vehicle arranged on a same side of this vehicle. Of course, it is understood that this system can also be applied to each of the pairs of front and rear wheels arranged on a same side of the vehicle.

The invention claimed is:

1. System for determining the inflating pressures of tires mounted on front and rear wheels of a motor vehicle, comprising:
   means for acquiring inflating pressures of the tires of the front and rear wheels;
   means or acquiring vertical accelerations of the front and rear wheels; and
   means for merging the acquired pressures and the acquired accelerations to estimate the inflating pressures of the tires of the front and rear wheels,
   wherein the merging means comprise:
   means for estimating the coefficients of stiffness of the tires of the front and rear wheels as a function of the acquired vertical accelerations of these wheels; and
   means for estimating the inflating pressures of the tires of the front and rear wheels as a function of the acquired inflating pressures and of the acquired coefficients of stiffness of the tires of the front and rear wheels.

2. System according to claim 1, wherein the means for estimating the coefficients of stiffness comprise means for temporally resetting one of the acquired accelerations on the other of the acquired accelerations and means for calculating the coefficients of stiffness as a function of the thus temporally reset accelerations.

3. System according to claim 2, wherein the temporally resetting means comprise means for calculating the inter-correlation of the acquired accelerations and means for applying a delay corresponding to the maximum of the calculated inter-correlation to the acquired acceleration of the front wheel.

4. System according to claim 2, wherein the means for calculating the coefficients of stiffness are adapted to implement a recursive least square algorithm in real time based on a predetermined mechanical model of the wheel.

5. System according to claim 1, wherein the means for estimating the coefficients of stiffness comprise means for bandpass filtering the acquired accelerations arranged between means for acquiring the accelerations and the temporally resetting means.

6. System according to claim 5, wherein the passband filtering means are adapted to perform filtering in a range of frequencies substantially equal to [8, 20] Hz.

7. System according to claim 1, wherein the estimation means are adapted to estimate said coefficients of stiffness from a mono-wheel mechanical model of the front and rear wheels.

8. System according to claim 7, wherein the estimation means are adapted to estimate said coefficients of stiffness based on a model in discrete time of the temporally reset accelerations of the front and rear wheels according to the equation:

$$Avr(k) = \frac{1}{mrr}(mra \times Ava(k-n) \; Zva(k-n) - Zvr(k))\begin{pmatrix} Kpr(k)/Kpa(k) \\ Kpr(k) \end{pmatrix}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are the coefficients of stiffness of the tires of the rear and front wheels, respectively, and n is a sampling instant corresponding to a time shift between the rear and front wheels subjected to a same portion of the roadway.

9. System according to claim 7, wherein the estimation means are adapted to estimate said coefficients of stiffness based on a model in discrete time of the temporally reset accelerations of the front and rear wheels according to the equation:

$$Ava(k) = \frac{1}{mra}(mrr \times Avr(k+n) \; Zvr(k+n) - Zva(k))\begin{pmatrix} Kpa(k)/Kpr(k) \\ Kpa(k) \end{pmatrix}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are coefficients of stiffness of the tires of the rear and front wheels, respectively, and n is a sampling instant corresponding to a time shift between the rear and front wheels subjected to a same portion of the roadway.

10. System according to claim 1, wherein the estimation means are adapted to estimate said coefficients of stiffness from a bicycle mechanical model thereof.

11. System according to claim 10, wherein the estimation means are adapted to estimate said coefficients of stiffness based on a model in discrete time of the temporally reset accelerations of the front and rear wheels according to the equation:

$$Avr(k) = \begin{pmatrix} \frac{mra}{mrr}Ava(k-n) \\ \frac{1}{mrr}(Zva(k-n) - Zvr(k)) \\ \frac{1}{mnr}\dot{Z}va(k-n) \\ -\frac{1}{mrr}\dot{Z}vr(k) \end{pmatrix}^T \begin{pmatrix} Kpr(k)/Kpa(k) \\ Kpr(k) \\ (Kpr(k)/Kpa(k)) \times Ra(k) \\ Rr(k) \end{pmatrix}$$

where k is the $k^{th}$ sampling instant, Avr and Ava are the vertical accelerations of the rear and front wheels, respectively, Zvr and Zva are the altitudes of the centers of the rear and front wheels, respectively, Kpr and Kpa are coefficients of stiffness of the tires of the rear and front wheels, respectively, n is a sampling instant corresponding to a time shift between the rear and front wheels subjected to a same portion of the roadway, Ra and Rr are coefficients of stiffness of the suspensions of the front and rear wheels, respectively, and $\dot{Z}va$ and $\dot{Z}vr$ are first derivatives of the altitudes of the centers of the front and rear wheels, respectively.

12. System according to claim 1, wherein the means for estimating the inflating pressures are adapted to implement, for each of the front and rear wheels, a Kalman estimator based on a model linking the inflating pressure and the coefficient of stiffness of the wheel tire.

13. System according to claim 1, wherein the merging means are adapted to implement a Kalman estimator based on a model linking the inflating pressures of the tires and the vertical accelerations of the front and rear wheels.

14. System according to claim 1, wherein the system further comprises means for diagnosing the operating state of the means for acquiring the inflating pressures and the mounting states of the tires as a function of the estimated and acquired inflating pressures and of the acquired vertical accelerations of the front and rear wheels.

15. System according to claim 14, wherein, if an acquired inflating pressure and its associated estimated pressure differ by more than X%, where X is a predetermined number, the diagnostic means are adapted to calculate the inflating pressures of the tires of the front and rear wheels as a function of the acquired vertical accelerations of these wheels, so as to compare the acquired pressure to the calculated pressures and to determine that, if the acquired pressure corresponds to one of the calculated pressures, the tire associated to the calculated pressure corresponding to the acquired pressure has been mounted in reverse.

16. System according to claim 15, wherein, if none of the tires is mounted in reverse, then the diagnostic means are adapted to diagnose that the acquisition means associated to the acquired pressure are defective.

17. System for determining the inflating pressures of tires mounted on front and rear wheels of a motor vehicle, comprising:

means for acquiring inflating pressures of the tires of the front and rear wheels;

means or acquiring vertical accelerations of the front and rear wheels; and means for merging the acquired pressures and the acquired accelerations to estimate the inflating pressures of the tires of the front and rear wheels, wherein the merging means are adapted to implement a Kalman estimator based on a model linking the inflating pressures of the tires and the vertical accelerations of the front and rear wheels.

18. System for determining the inflating pressures of tires mounted on front and rear wheels of a motor vehicle, comprising:

means for acquiring inflating pressures of the tires of the front and rear wheels;

means or acquiring vertical accelerations of the front and rear wheels; and means for merging the acquired pressures and the acquired accelerations to estimate the inflating pressures of the tires of the front and rear wheels, wherein the system further comprises means for diagnosing the operating state of the means for acquiring the inflating pressures and the mounting states of the tires as a function of the estimated and acquired inflating pressures and of the acquired vertical accelerations of the front and rear wheels, wherein, if an acquired inflating pressure and its associated estimated pressure differ by more than X%, where X is a predetermined number, the diagnostic means are adapted to calculate the inflating pressures of the tires of the front and rear wheels as a function of the acquired vertical accelerations of these wheels, so as to compare the acquired pressure to the calculated pressures and to determine that, if the acquired pressure corresponds to one of the calculated pressures, the tire associated to the calculated pressure corresponding to the acquired pressure has been mounted in reverse.

19. System according to claim 18, wherein, if none of the tires is mounted in reverse, then the diagnostic means are adapted to diagnose that the acquisition means associated to the acquired pressure are defective.

* * * * *